United States Patent [19]

Ozeki et al.

[11] Patent Number: 5,390,017
[45] Date of Patent: Feb. 14, 1995

[54] OPTICAL NETWORK ANALYZER FOR MEASURING THE AMPLITUDE CHARACTERISTICS AND GROUP DELAY TIME DISPERSION CHARACTERISTICS OF AN OPTICAL CIRCUIT DEVICE

[75] Inventors: Takeshi Ozeki, Tokyo; Manish Sharma; Hiroyuki Ibe, both of Yokohama, all of Japan

[73] Assignee: Kabushiki Kaisha Toshiba, Kawasaki, Japan

[21] Appl. No.: 111,002

[22] Filed: Aug. 24, 1993

[30] Foreign Application Priority Data

Aug. 25, 1992 [JP] Japan .................................. 4-225817

[51] Int. Cl.⁶ ........................ G01N 21/84; G01N 21/41
[52] U.S. Cl. ................................................. 356/73.1
[58] Field of Search ...................... 356/73.1; 250/227.21

[56] References Cited

U.S. PATENT DOCUMENTS

4,750,833  6/1988  Jones .................................. 356/73.1
4,984,884  1/1991  Ryu et al. ........................... 356/73.1

OTHER PUBLICATIONS

Tanaka, Shigeru, et al., Journal of Lightwave Technology, vol. LT-2, No. 6, Dec. 1984, pp. 1040–1044. "Measurement Accuracy of Chromatic Dispersion by the Modulation Phase Technique".
Costa, B., et al., Electronics Letters, vol. 19, No. 25/26, Dec. 8, 1983, pp. 1074–1076. "Phase-Shift Technique for the Measurement of Chromatic Dispersion in Single-Mode Optical Fibres Using LEDs".
Jungerman, Roger L., et al., IEEE Journal of Quantum Electronics, vol. 27, No. 3, Mar. 1991, pp. 580–587.

"Frequency Domain Optical Network Analysis Using Integrated Optics".

*Primary Examiner*—Vincent P. McGraw
*Attorney, Agent, or Firm*—Oblon, Spivak, McClelland, Maier, & Neustadt

[57] ABSTRACT

An optical network analyzer measures the amplitude characteristics and group delay time dispersion characteristics of an optical circuit device. In the optical network analyzer, the intensity of the light generated by a first light source is modulated by use of a modulation signal having a constant frequency and a constant amplitude. Part of the intensity-modulated light is used as a reference optical signal, and the remaining part is made to pass through the optical circuit device, thus obtaining an optical signal to be measured. The reference optical signal and the optical signal to be measured are photoelectrically converted into electric signals, and the modulated signal components of the electric signals are compared with each other, thus obtaining an amplitude ratio and a phase difference. The optical frequency of the first light source is swept in a constant cycle, and the amplitude ratio and phase difference are displayed on a display device in synchronism with the frequency sweeping. To implement an optical frequency marker, light having an arbitrarily-designated optical frequency is generated by a second light source. The light generated by the second light source is made to join part of the light generated by the first light source, so as to produce a peak at the designated optical frequency. The peak is electrically extracted and superimposed on the amplitude ratio and phase difference displayed on the display device.

5 Claims, 2 Drawing Sheets

OPTICAL NETWORK ANALYZER FOR MEASURING THE AMPLITUDE CHARACTERISTICS AND GROUP DELAY TIME DISPERSION CHARACTERISTICS OF AN OPTICAL CIRCUIT DEVICE

BACKGROUND OF THE INVENTION

1. Field of the Invention

The present invention relates to an optical network analyzer for measuring the amplitude characteristics and group delay time dispersion characteristics of an optical circuit device.

2. Description of the Related Art

As is well known, the optical fibers utilized in an optical communication line have come to play a more and more important role in the communication infrastructure of an intellectual information-oriented society, and have therefore required further improvement. In particular, optical fibers enabling both a high data transmission speed and a long repeater-to-repeater distance have come to be required, so as to meet the demand for an economic optical communication line.

In recent years, progress has been made in the technology for developing a light amplifier that employs optical fibers doped with Er (erbium). This type of light amplifier can compensate for the loss of an optical transmission line, and is therefore expected to considerably lengthen the repeater-to-repeater distance. Progress has also been made in the technology for developing large-capacity optical communication lines wherein a number of optical frequencies are multiplexed as carriers, as in a coherent communication system.

In these next-generation optical communication systems, it is necessary to employ optical circuit devices wherein the transmission characteristics are defined at high level. For example, an optical circuit device for compensating for group delay dispersions and an optical multiplex division circuit are required. It is also necessary to accurately measure or evaluate the group delay time dispersion characteristics and amplitude characteristics of the entire optical transmission system (including an optical fiber transmission line and optical circuit devices).

With the present technology, however, it is very difficult to measure the group delay time dispersion characteristics of an optical circuit device with high optical frequency resolution and in an optical frequency band in the range of several hundred gigahertz (GHz), and there is not means available for accurately measuring an important optical frequency characteristic, such as a central optical frequency of the optical circuit device.

SUMMARY OF THE INVENTION

As described above, the next-generation optical communication systems require optical circuit devices wherein the transmission characteristics are defined at a high level, such as an optical circuit device for compensating for group delay dispersions and an optical multiplex division circuit. Among the problems awaiting solution in connection with the next-generation optical communication systems, how to accurately measure the group delay time dispersion characteristics is of particular importance.

Accordingly, an object of the present invention is to provide an optical network analyzer which measures the amplitude characteristics and group delay time dispersion characteristics of an optical circuit device with high optical frequency resolution and in a wide frequency band, and which accurately measures an important optical frequency characteristic (e.g., a central optical frequency) of the optical circuit device.

According to the present invention, there is provided an optical network analyzer comprising:

a first light source for generating light having an arbitrary frequency;

a light modulator for modulating the intensity of the light generated by the first light source by use of a modulation signal having a predetermined frequency and a predetermined amplitude;

a light splitter for splitting the light modulated by the light modulator such that part of the modulated light is used as a reference optical signal;

a connector for permitting the light modulated by the light modulator to pass through an optical circuit device, and for detecting light which has passed through the optical circuit device;

a first photoelectric conversion section for performing photoelectric conversion with respect to the reference optical signal and the light which has passed through the optical circuit device and detected by the connector;

an amplitude/phase comparator for extracting modulated signal components from two electric signals obtained by the first photoelectric conversion section and for comparing the modulated signal components with each other, thereby obtaining an amplitude ratio and a phase difference;

a light source controller for sweeping an optical frequency of the first light source in a constant cycle; and a display device for displaying comparison results of the amplitude/phase comparator in synchronism with the frequency sweeping performed by the light source controller.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

One embodiment of the present invention will now be described with reference to the accompanying drawings.

Figure 1:
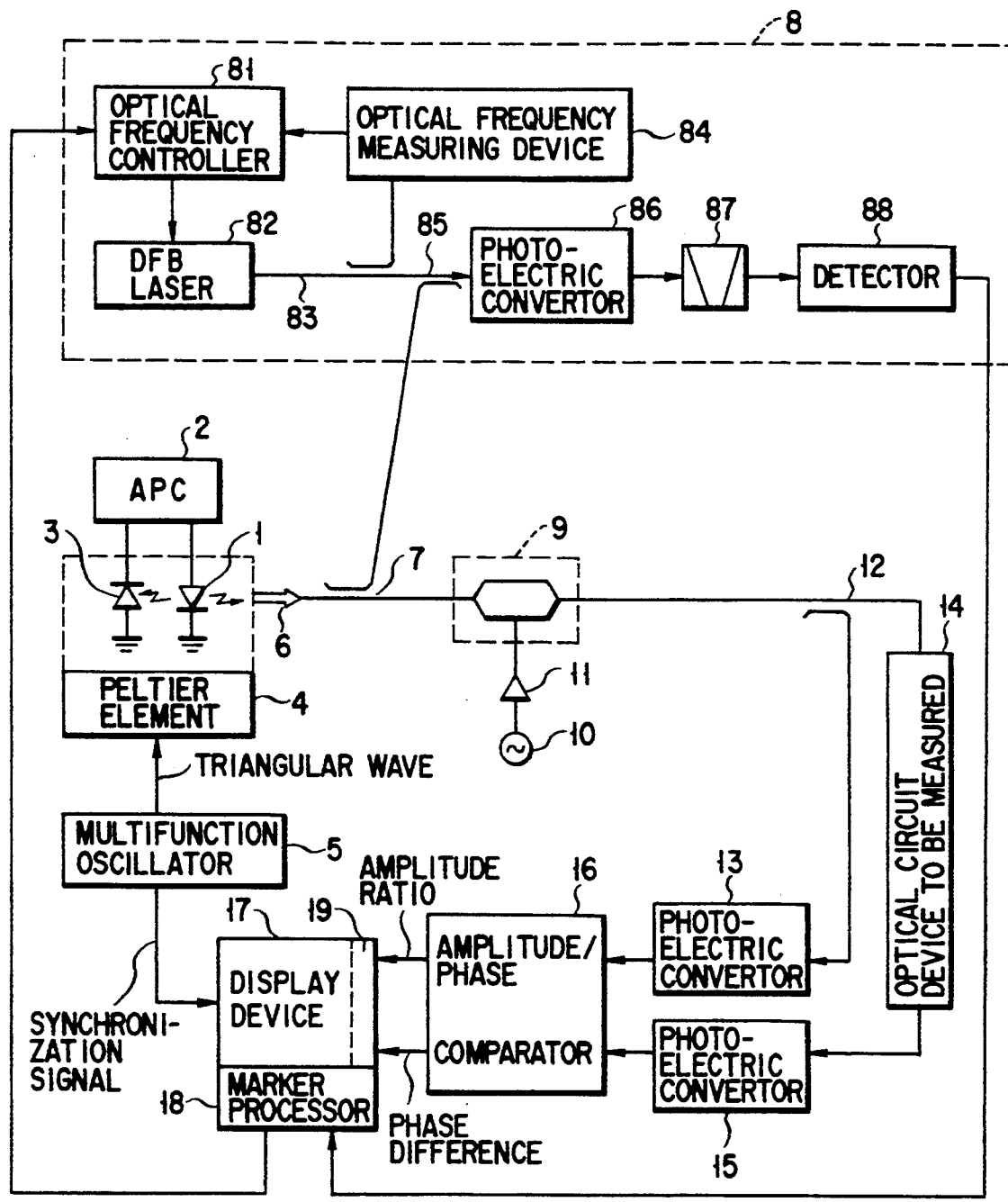
FIG. 1 is a block circuit diagram showing an optical network analyzer according to one embodiment of the present invention.

FIG. 1 shows an optical network analyzer according to the present invention. In FIG. 1, reference numeral 1 denotes a DFB laser, and its oscillation wavelength band is a 1.55 μm band, which is to be used in a future optical communication line. The DFB laser 1 is driven by an APC (auto power control) circuit 2 in such a manner that the light intensity received by the monitor photodiode (PD) 3 is constant at all times without reference to the optical frequency.

The DFB laser 1 is mounted on a Peltier element 4. The Peltier element 4 is used to control the temperature of the DFB laser 1. The Peltier element 4 is driven by extremely low frequency triangular waveform (typical frequency: 0.01 Hz) generated by a multifunction oscillator 5. This causes an LD laser temperature (hence, laser oscillation wavelength or optical frequency) to vary in a triangular fashion. The peak-to-peak optical frequency variation is typically 200 GHz.

The output waveform of the DFB laser 1 can be detected on the basis of the temperature of the laser 1 which is measured by a thermistor incorporated in a DFB laser module. Needless to say, the output waveform of the DFB laser 1 may be detected by employing a wavemeter.

The light output of the DFB laser 1 is directed to a first light splitter 7 via an optical isolator 6. By the first light splitter 7, the light is split into two optical signals. One of the two optical signals is directed to a marker generator 8, while the other optical signal (a main optical signal) is directed to a light modulator 9. The light modulator 9 can employ a Mach-Zehnder interferometer formed of $LiNbO_3$. To the light modulator 9, a sinusoidal-wave modulation signal generated by a modulation signal generator 10 and having a frequency of fm (fm: typically 1 GHz) is supplied through a power amplifier 11. In accordance with this modulation signal, the optical signal directed to the light modulator 9 is modulated.

The light output of the light modulator 9 is directed to a second light splitter 12, by which the light output is split into two light components. One of the light components (a reference optical signal) is directed to a first photoelectric converter 13 and is converted thereby into a reference signal. The other light component is directed to a light circuit device 14 under measurement, the light output of the light circuit device is an optical signal to be measured. The optical signal to be measured is directed to a second photoelectric converter 15 and is thereby converted into a to-be-measured electric signal.

The reference signal and the to-be-measured electric signal, which are produced by the first and second photoelectric converters 13 and 15, respectively, are supplied to an amplitude/phase comparator 16. The amplitude/phase comparator 16 extracts sinusoidal signal components of modulated frequency fm from each of the reference signal and the to-be-measured electric signal, so as to obtain an amplitude ratio and a phase difference between the reference signal and the to-be-measured electric signal. The amplitude ratio and the phase difference are supplied to a display device 17.

The display device 17 is supplied with a synchronization signal (i.e., a clock by which to form a triangular wave used for the optical frequency sweeping of the DFB laser 1) output from the multifunction oscillator 5. On the basis of the synchronization signal, the display device 17 displays the amplitude ratio and the phase difference supplied from the comparator 16 in the form of a graph corresponding to the optical frequency of the DFB laser 1.

An optical frequency marker processor 18 is connected to the display device 17. The marker processor 18 comprises an operation input section for designating an arbitrary optical frequency. When one optical frequency is designated by an input operation using the operation input section, the information on the designated optical frequency is supplied to the marker generator 8. A marker signal generated by the marker generator 8 is displayed on the display device 17 together with the amplitude ratio and phase difference.

The marker generator 8 is made up of the following: an optical frequency controller 81; a second DFB laser 82; a third light splitter 83; an optical frequency measuring device 84; an optical confluence device 85; a third photoelectric converter 86; a band pass filter (BPF) 87; and a detector 88. The information on the optical frequency designated by the marker processor 18 is supplied to the optical frequency controller 81. The optical frequency controller 81 controls the second DFB laser 82 (the temperature of which is stabilized at all times) such that the second DFB laser 82 generates an optical signal having the designated frequency. The optical signal generated by the DFB laser 82 is directed to the third light splitter 83 and is thereby split into two optical signal components. One of the optical signal components is directed to the optical frequency measuring device 84 to measure the optical frequency. After the measurement of the optical frequency, the optical signal component is fed back to the optical frequency controller 81. By this feedback loop, the optical frequency controller 81 controls the second DFB laser 82 such that the oscillation frequency of the laser 82 becomes equal to the designated optical frequency.

The other one of the optical signal components obtained by the third light splitter 83 is directed to the optical confluence device 85, where it joins the optical signal (i.e., a frequency-sweeping optical signal) sent from the first light splitter 7. When the two optical signals are coincident in optical frequency, a peak is produced. An optical signal having this peak is directed to the third photoelectric converter 86, thereby converting the optical signal into an electric signal. The electric signal is supplied to the band pass filter 87, for removing low-frequency components and noise components from the electric signal. Therefore, only the peak component of the electric signal is supplied to the detector 88. The detector 88 detects the d.c. components of the peak component and supplies the detected d.c. components to the marker processor 18 as a marker signal.

A description will now be given as to how the above-mentioned optical network analyzer operates.

Light output from the first DFB laser 1 is controlled by the APC circuit 2 such that the intensity of the light is maintained constant without reference to the optical frequency. The light is modulated by the light modulator in accordance with a sinusoidal-wave modulation signal. The modulated light is split into two components by the second light splitter 12. One of the two components is used as a reference optical signal, while the other component is made to pass through the light circuit device 14. The component which has passed through the light circuit device is an optical signal to be measured.

The reference optical signal and the to-be-measured optical signal are photoelectrically converted by the first and second photoelectric converters 13 and 15, respectively, and the electric signals obtained thereby are supplied to the amplitude/phase comparator 16. The amplitude/phase comparator 16 extracts sinusoidal signal components of modulated frequency fm from each of the reference signal and the to-be-measured electric signal, and obtains an amplitude ratio and a phase difference. It should be noted that the amplitude ratio corresponds to the transmission loss or gain of the light circuit device 14 operated at a certain wavelength, and the phase difference corresponds to the delay time of the light circuit device 14 operated at that wavelength.

Due to the temperature control by the Peltier element 4, the optical frequency of the first DFB laser 1 is swept by typically 200 GHz, in a triangular waveform. Thus, the amplitude ratio and phase difference obtained by the comparator 15 corresponds to the optical frequency. Hence, optical transmission loss or gain and group delay corresponding to the optical frequency of the DFB laser 1 can be displayed by supplying a triangular-waveform synchronization signal generated by the multifunction oscillator 5 to the display device 17 and by displaying the amplitude ratio and the phase difference on the time series basis on the basis of the synchronization signal.

Figure 2:
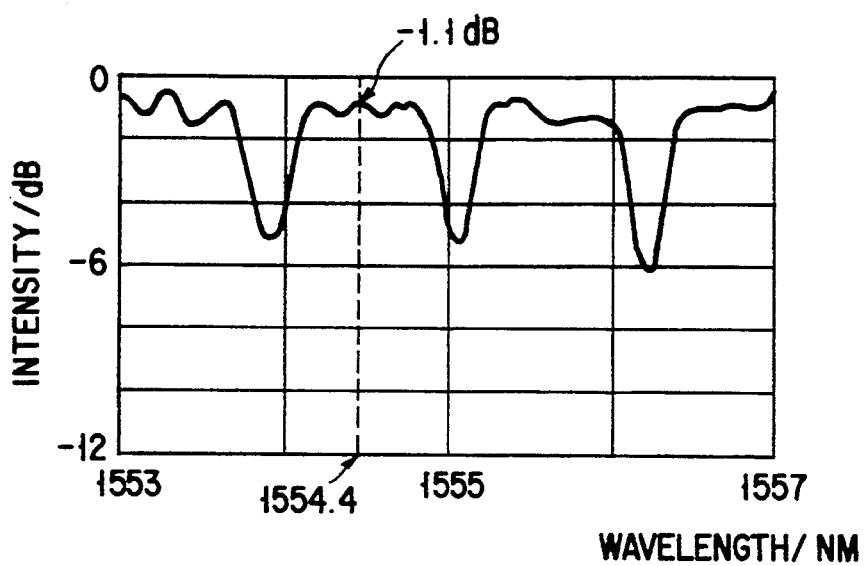
FIG. 2 shows wavelength-dependent transmission loss characteristics of a typical optical device, as measured by the embodiment.

As can be seen from the above, the amplitude ratio pertaining to a sinusoidal wave superimposed on an optical signal can be displayed in relation to changes in optical frequency. Thus, the transmission loss (i.e., the amplitude characteristics) of the optical circuit device 14 can be measured with high optical frequency resolution and in a wide frequency band. FIG. 2 is an example of a graph showing how the amplitude characteristics are displayed on the display device 17. In FIG. 2, the wavelength (frequency) is plotted against the axis of abscissa, and the optical intensity (amplitude ratio) is plotted against the axis of coordinate.

Figure 3:
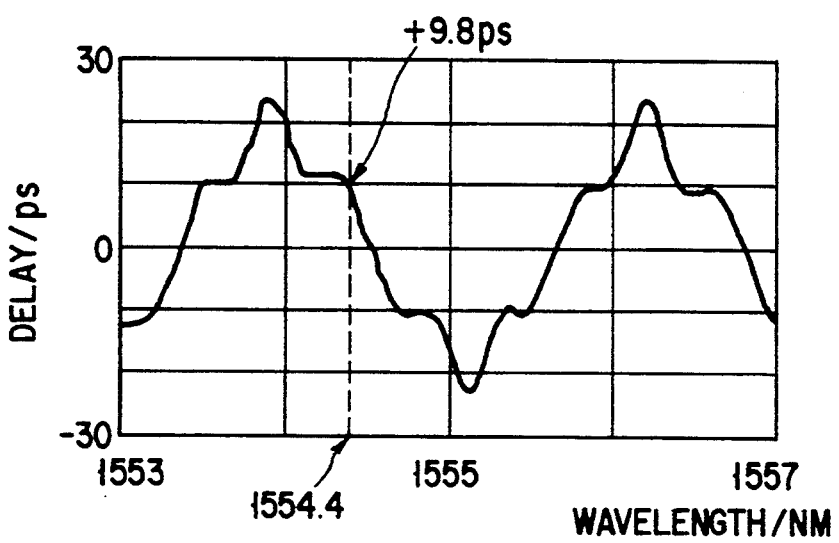
FIG. 3 shows wavelength-dependent group delay characteristics of a typical optical device, as measured by the embodiment.

In addition, the phase difference between the reference signal of a sinusoidal wave and the signal to be measured can be displayed in relation to changes in optical frequency. Thus, the group delay characteristics of the to-be-measured optical circuit device 14 can be measured with high optical frequency resolution and in a wide frequency band. FIG. 3 is an example of a graph showing how the group delay characteristics are displayed on the display device 17. In FIG. 3, the wavelength (frequency) is plotted against the axis of abscissa, and the delay time (phase difference) is plotted against the axis of coordinate.

In the embodiment mentioned above, the marker generator 8 and the optical frequency marker processor 18 are employed for measuring the transmission loss and group delay time at a particular frequency. When an arbitrary optical frequency is designated by the marker processor 18, the information on the designated optical frequency is supplied to the optical frequency controller 81 of the marker generator 8. Upon receipt of the information, the optical frequency controller 81 controls the second DFB laser 82 (the temperature of which is stabilized at all times) to generate an optical signal having the designated frequency. Part of the optical signal generated by the second DFB laser 82 is fed back to the optical frequency controller 81 by way of both the third light splitter 83 and the optical frequency measuring device 84, so as to maintain the oscillation frequency of the second DFB laser 82 at the optical frequency designated by the marker processor 18.

The remaining part (main part) of the optical signal generated by the second DFB laser 82 passes through the third light splitter 83 and then joins the optical signal (i.e., a frequency-sweeping optical signal) sent from the first light splitter 7. When the frequencies of the two optical signals are coincident with each other, a peak is produced. An optical signal having this peak is directed to the third photoelectric converter 86, thereby converting the optical signal into an electric signal. The electric signal is supplied to the band pass filter 87, and only the peak component of the electric signal is supplied to the detector 88. The detector 88 detects the d.c. components of the peak component and supplies the detected d.c. components to the marker processor 18 as a marker signal.

As a result of the operation mentioned above, the marker processor 18 causes the display device 17 to indicate a mark at the designated optical frequency position on the screen. The mark is made, for example, by a broken line, as indicated in FIGS. 2 and 3. The transmission loss and the group delay time at the designated optical frequency are readily known by reading the amplitude ratio and phase difference at the position of the mark.

The present invention is not limited to the embodiment described above. For example, a numeral display controller 19 may be connected to the display device 17, as shown in FIG. 1. In the case where the numeral display controller 19 is employed, the amplitude ratio and phase difference obtained by the comparator 16 are converted into digital values, and these digital values are correlated with optical frequencies so as to represent the transmission loss and delay time. The values obtained thereby are displayed, as shown in FIGS. 2 and 3. When the transmission loss and delay time are represented as values, the measurement can be made with higher accuracy. In addition to this, the present invention can be modified in various manners without departing from the spirit and scope of the present invention.

As described above, the present invention can provide an optical network analyzer which can measure the amplitude characteristics and group delay time dispersion characteristics of an optical circuit device with high optical frequency resolution and in a wide frequency band, and which can accurately measure an important characteristic which the optical circuit device exhibits at a given optical frequency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical network analyzer, comprising:
   a first light source for generating light having an arbitrary frequency;
   a light modulator for modulating an intensity of the light generated by the first light source by use of a modulation signal having a predetermined frequency and a predetermined amplitude;
   a light splitter for splitting the light modulated by the light modulator such that part of the modulated light is used as a reference optical signal;
   a connector for permitting the light modulated by the light modulator to pass through an optical circuit device;
   a first photoelectric conversion section for performing photoelectric conversion with respect to the reference optical signal and the light which has passed through the optical circuit device;

an amplitude/phase comparator for extracting modulated signal components from two electric signals obtained by the first photoelectric conversion section and for comparing the modulated signal components with each other, thereby obtaining an amplitude ratio and a phase difference;

a light source controller for sweeping an optical frequency of the first light source in a constant cycle; and a display device for displaying comparison results of the amplitude/phase comparator in synchronism with the frequency sweeping performed by the light source controller.

2. An optical network analyzer according to claim 1, further comprising:

a second light source for generating light having an arbitrary frequency;

an optical frequency controller for controlling the second light source such that the second light source generates light having an optical frequency designated by an external input operation;

an optical coupling section for permitting part of the light generated by the first light source to join the light generated by the second light source;

a second photoelectric conversion section for performing photoelectric conversion with respect to light output from the optical coupling section;

a filter for removing low-frequency components and noise components from an output signal from the second photoelectric conversion section;

a detector for detecting a peak of a signal which has passed through the filter; and a marker processor for causing an output signal from the detector to be displayed on the display device as a mark.

3. An optical network analyzer according to claim 1, further comprising:

a numeral display controller for converting the amplitude ratio and a phase difference obtained by the amplitude/phase comparator into digital values, for correlating the digital values with optical frequencies so as to permit the digital values to represent a transmission loss and a delay time, and for causing the display device to display the digital values correlated with the optical frequencies.

4. An optical network analyzer, comprising:

a first light source for generating light having an arbitrary frequency;

a light modulator for modulating the intensity of the light generated by the first light source with a modulation signal having a predetermined amplitude;

a means for coupling the light from the light modulator to be transmitted into an optical circuit device whose characteristics are to be measured;

an optical splitting device to allow part of the light modulator output to be tapped for use as a reference signal;

a first photoelectric conversion section for detecting the modulation signal carried by the reference signal to be detected;

a second photoelectric conversion section for detecting the modulation signal carried by the optical signal that has passed through the optical circuit device;

an amplitude and phase comparator for comparing the amplitude and phase of the modulation signals detected by the first and second photoelectric conversion sections, thereby obtaining an amplitude ratio and a phase difference;

a light source controller for sweeping the optical frequency of the first light source in a constant cycle; and a display device for displaying comparison results of the amplitude and phase comparator in synchronism with the frequency sweeping performed by the light source controller.

5. An optical network analyzer according to claim 4, further comprising:

a second light source for generating light having an arbitrary frequency;

an optical frequency controller for controlling the second light source such that the second light source generates light having an optical frequency designated by an external input operation;

an optical coupling section for permitting part of the light generated by the first light source to join the light generated by the second light source;

a third photoelectric conversion section for performing photoelectric conversion with respect to light output from the optical coupling section;

a filter for removing low-frequency components and noise components from an output signal from the third photoelectric conversion section;

a detector for detecting a peak of a signal which has passed through the filter; and a marker processor for causing an output signal from the detector to be displayed on the display device as a mark.

* * * * *